July 5, 1960

R. RING 2,943,397

BORE HOLE SURVEYING METHOD AND APPARATUS

Filed June 21, 1955

INVENTOR.
ROLAND RING
BY
ATTORNEYS

INVENTOR.
ROLAND RING

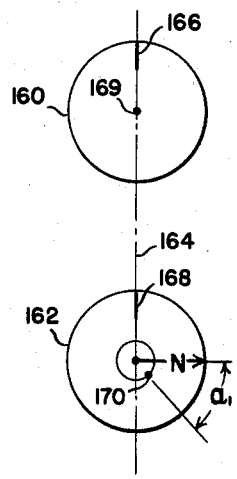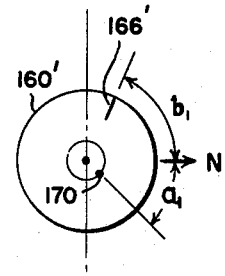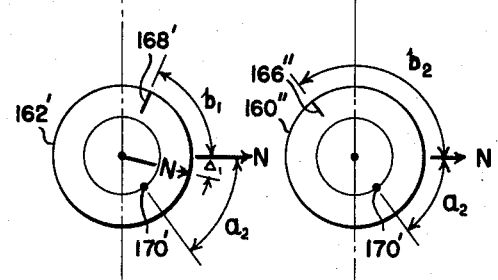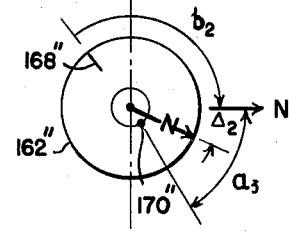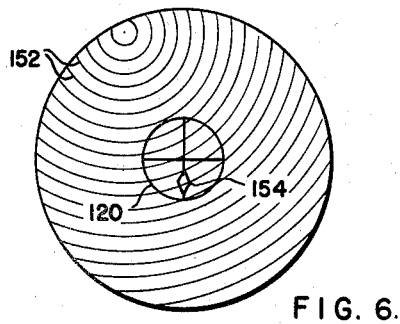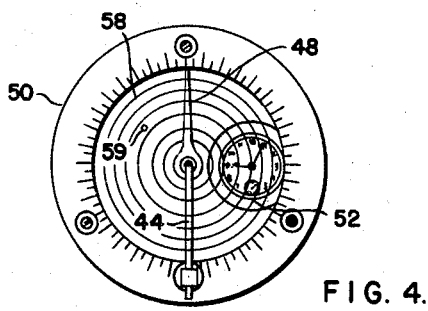
FIG. 7A.
FIG. 7B.
FIG. 6.
FIG. 7C.
FIG. 4.
*INVENTOR.*
ROLAND RING
BY
ATTORNEYS United States Patent Office 2,943,397
Patented July 5, 1960

2,943,397
BORE HOLE SURVEYING METHOD AND APPARATUS

Roland Ring, Houston, Tex., assignor to Sperry-Sun Well Surveying Company, Philadelphia, Pa., a corporation of Delaware Filed June 21, 1955, Ser. No. 516,811

4 Claims. (Cl. 33—205.5)

This invention relates to a method and apparatus for surveying bore holes and, more particularly, to a method and apparatus for correcting for inaccurate gyroscopic directional indications resulting from gyroscope drift and from the high angle of gyroscope rotor tilt encountered in surveying high angle holes by means of recorded azimuthal direction indications of a gyroscope.

As is well known in the art, magnetic compass indications of azimuthal direction in a bore hole are unreliable because of the presence of ore bodies and other influencing factors tending to cause deviation of the compass pointer from true magnetic north. For this reason gyroscopic instruments are employed to provide more accurate azimuthal direction indications. While gyroscopic instruments are subject to deviation due to rotor drift, under normal conditions of operation when the instrument is moving through a substantially straight hole, the rate of drift of the rotor may be predetermined and will remain substantially constant so long as the rate of speed of the rotor is maintained substantially constant. However, in surveying bore holes having relatively high angles of deviation from vertical, as the instrument passes through portions of the bore hole having changing angles of deviation the rotor drift becomes irregular and the rate of drift varies with variations in the angle of inclination of the rotor casing as the casing of the instrument containing the gyroscope follows the deviations from vertical of the bore hole.

An additional factor tending to introduce error in the indication of azimuthal direction obtained by a gyroscopic instrument arises from the fact that it is desirable from a practical standpoint to maintain the azimuthal direction indicating means which is positioned by the gyroscope rotor in a plane extending transversely of the longitudinal axis of the bore hole surveying instrument. It will be evident, of course, that as the bore hole deviates from vertical the gyroscope assembly, which is mounted in gimbals to permit it to position itself independently of the instrument casing, will assume variously displaced positions with respect to the azimuthal indicating means and thus there must be some connection providing the function of a universal joint between the gyroscope and the azimuthal direction indicating means. In high angle holes, the error which is introduced through the connecting means becomes appreciable and must be corrected.

In the conventional gyroscopic well surveying instrument there is involved apparatus for photographically recording the indications of inclination indicating means, gyroscopic azimuthal direction indicating means and time indicating means. A succession of these recordings are made and the time at which the recordings are made is correlated with the known depth of the instrument in the earth at that particular time. Thus there is provided a succession of recordings each of which is made at a known depth in the earth and each of which indicates an angle of inclination and the azimuthal direction of the angle of inclination at that particular depth. The present invention contemplates the employment in conjunction with the gyroscopic well surveying instrument of a second instrument for indicating and recording indications of inclination. If the arrangement of the two instruments is such that, upon the making of each successive record by the gyroscopic instrument, a record is made by the second inclinometer at a depth in the bore hole at which the prior record was made by the gyroscopic instrument and if the two instruments are connected together in such a manner that the two records which are made at the same time at adjacent depths in the earth are azimuthally related, the azimuthal indication obtained by the gyroscopic instrument in the making of its former record may be employed to check the azimuthal indication made by the gyroscopic instrument in the subsequent record.

This method of surveying and apparatus for carrying out the method are more fully described hereinafter in conjunction with the accompanying drawings, in which:

Figure 4 is a plan view of a record produced by the gyroscopic instrument;

Figure 6 is a plan view of a record produced by the inclinometer; and

Figures 7A, 7B and 7C are a succession of diagrammatic indications of a succession of records obtained by the apparatus illustrating the method of surveying involved in the invention.

Figure 1:
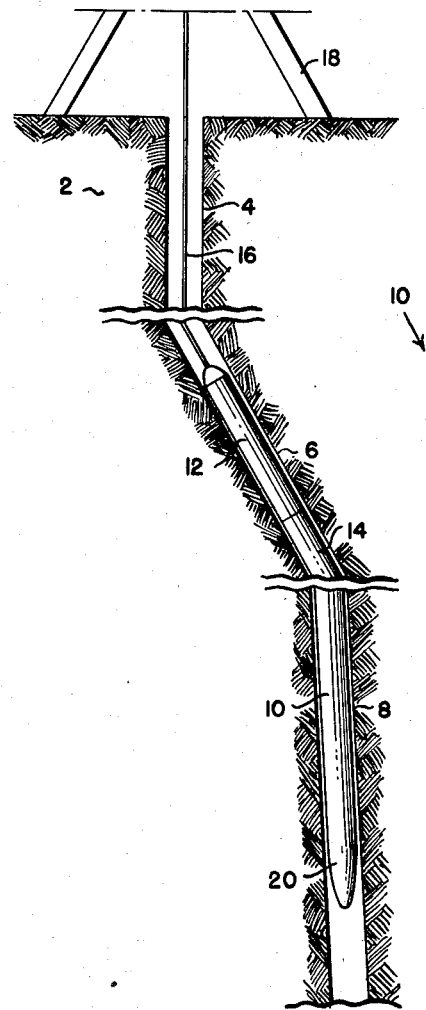
Figure 1 is a longitudinal section through a bore hole in the earth showing apparatus embodying the invention positioned therein.

In Figure 1 there is shown extending through the earth 2 a bore hole which for a distance adjacent to the surface of the earth extends substantially vertically downwardly into the earth as indicated at 4 and then for a region indicated at 6 extends for a relatively high angle of inclination and thereafter through a region indicated at 8 extends at a relatively low angle of inclination. The apparatus lowered into the bore hole includes, as will be hereinafter described in greater detail, a gyroscopic surveying instrument 10 connected to an inclination indicating instrument 12 by means of a length of pipe 14. The entire assembly is lowered into the bore hole on a wire line 16 from a conventional drilling derrick 18.

Figure 2A:
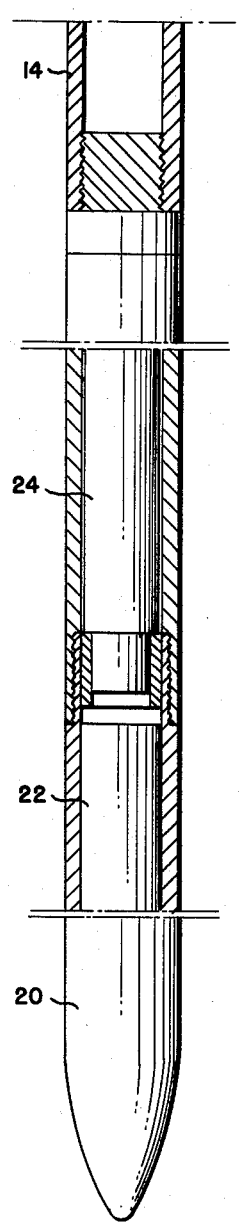
Figures 2A and 2B show a partially cut-away elevation of the apparatus including the two instruments and a length of tubing connecting the two instruments.
Figure 2B:
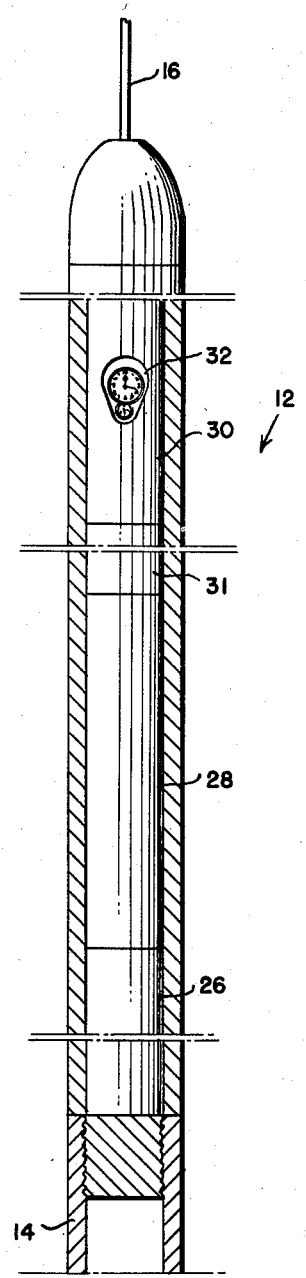

In Figure 2A there is indicated generally at 10 the gyroscopic instrument which includes in a casing portion 20 conventional shock absorbing apparatus, in portion 22 a housing for batteries, and in portion 24 the gyroscopic instrument. The gyroscopic surveying instrument indicated generally at 10 in Figure 2A is connected by means of a section of pipe or drill stem 14 to an inclination indicating and recording instrument indicated generally at 12 in Figure 2B. This instrument includes a portion 26 mounting an inclination unit, a portion 28 mounting a film holding and illuminating assembly, a portion 31 containing batteries and a portion 30 mounting a timer and including an exposed clock face 32. The uppermost end of the instrument 12 is connected to the wire line 16 by conventional connecting means.

Figures 3A, 3B, 5:
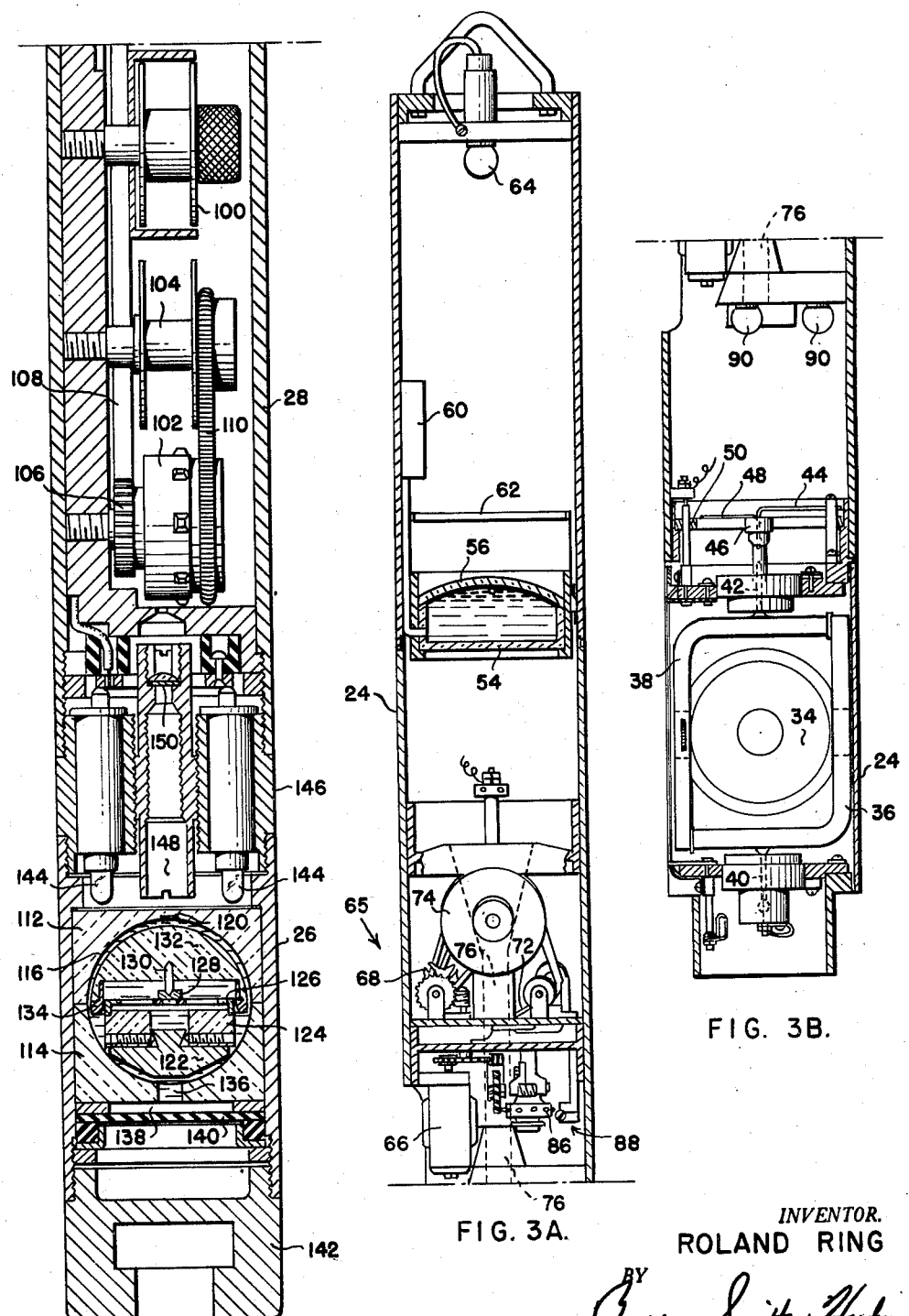
Figures 3A and 3B are enlarged axial sections showing details of the gyroscopic instrument.
Figure 5 is an enlarged axial section showing details of the instrument for recording indications of inclination.

The gyroscopic well surveying instrument 10 is fully described in the patent to Williston et al. 1,960,038, issued May 22, 1934, and includes, as is indicated in Figures 3A and 3B, a gyroscope with a horizontal spinning axis mounted within a casing 34 which is pivoted in antifriction bearings about an axis transverse to the axis of rotation of the rotor in a gimbal ring formed by two L-shaped members 36 and 38. The member 36 is pivoted at its lower end on a spindle 40 and the member 38 is pivoted at its upper end on a spindle 42. The spindles 40 and 42 are in longitudinal axial alignment and are supported by means of suitable antifriction bearings and include means for conducting electric power to the gyroscope rotor driving motor in the manner fully described in the above-mentioned patent and including a conductor 44 which extends radially on a transverse plane between the mounting for the upper spindle 42 and the radially outer portion of the instrument. A member 46 carried by the upper spindle 42 carries a pointer 48, the outer end of which rotates adjacent to a concentric dial 50 secured within the instrument casing.

Adjacent to the dial there is positioned a watch or other time piece which is arranged to be photographed simultaneously with the dial and pointer, as indicated at 52, Figure 4.

In the upper portion of the instrument casing, as shown in Figure 3A, there is removably located a box level 54 having at least its top and bottom formed of glass, the top having a spherical surface as indicated at 56. The spherical surface of the box level is marked with a number of concentric circles 58 whereby the position of a bubble 59 may be readily located in a photograph as shown in Figure 4. A suitable liquid for use in the box level is a mixture of approximately 75% ethylene glycol and 25% water. An expansion chamber 60 communicating with the liquid in the level permits expansion of the liquid without seriously effecting the size of the bubble. An opal glass plate 62 located between the box level and a lamp 64 serves to diffuse the illumination from the lamp and provide a background for the bubble rendering the position thereof and the lines on the top 56 most readily discernable in a photograph.

Intermediate the gyroscope and the box level there is located a camera mechanism indicated generally at 65 in Figure 3A which is driven by means of a suitable motor 66. This motor which is operated from the batteries contained in the casing portion 22 shown in Figure 2A is connected through suitable gearing and a geneva type mechanism indicated at 68 through which a film feed sprocket is caused to intermittently rotate and carry a film 72 from a reel 74 across an aperture 76 at a point above and below which are mounted lenses not shown in the figure serving to project upon the film images of the level box circles 58 and bubble 59 and the pointer 48 and dial 50.

To eliminate the necessity of a shutter in connection with the camera, a flashing arrangement is provided comprising a wheel 86 having projections thereon adapted to contact and periodically close a switch arrangement indicated at 88 which is connected with the lamps 64 and 90 to intermittently illuminate the level and the gyroscope. The wheel 86 is driven from the motor 66 through suitable gearing and may be adjusted, for example, so as to produce momentary flashes of the lamps every ten seconds. The gearing between the film drive and the switch mechanism is so arranged that the film is stationary and properly aligned with the aperture 76 at the time the lamps are illuminated for the projection of an exposure. After the lamps are again extinguished, the film will be driven and intermittent movement so as to bring a successive portion in alignment with the aperture.

In operation of the device in determining orientation of a bore hole, the gyroscope is balanced by counterweights so that the axis of rotation will maintain its original set position with respect to the earth. The pointer will, of course, remain fixed with respect to this direction except for the drift and the displacement of the motion transmitted through the gimbal ring assembly as previously noted. Accordingly, even though the casing and the parts which it carries rotate during the descent into the bore hole, the position of the bubble with respect to the earth will be defined due to the simultaneous photographing of the dial and the bubble. The presence of the time piece in the same photograph enables a check upon the depth at which any exposure has been made since it is only necessary for an observer at the surface of the earth, as the cable is being payed out, to observe at what times determined lengths of cable have descended into the bore hole. By charting the corresponding lengths and times, the depths at which the exposures are made may be repeatedly ascertained from the readings of the time piece.

As previously described, the inclinometer unit includes casing portions 26 and 28 containing an inclination unit and recording apparatus, respectively, and also including a casing portion 30 including a timing mechanism and a portion 31 including batteries. An instrument of this type is fully described in my copending patent application Serial No. 395,949, filed December 3, 1953, now Patent No. 2,797,976, issued July 2, 1957. In the inclination unit employed with the present invention, there is involved as shown in Figure 5 within the housing portion 28 a film spool 100 adapted to provide a magazine for film which is drawn from the spool over a sprocket disc 102 and thereafter wound upon a receiving spool 104. The sprocket disc 102 is provided with a ratchet wheel 106 which is driven by means of an oscillating drive bar 108 actuated by mechanism not shown but which is fully described in the above-mentioned copending patent application. The spool 104 and the sprocket wheel 102 are connected by a drive belt 110 which serves to drive the spool 104 and wind up the film.

The inclination unit is contained within the casing portion 26. This unit comprises a pair of transparent members 112 and 114 desirably formed of glass which are clamped together within the instrument housing and provide a spherical chamber indicated at 116 at the top of which in the axis of the instrument there is inscribed a reference marking 120 consisting, for example, of a small circle with a cross therein. Within the spherical chamber there is located a counterweight 122, the lower surface of which is of frusto-conical shape as indicated in the drawings. Desirably, a circular edge at the large end of the frustum is arranged to engage and rest on the spherical inner surface of the chamber while the circle at the smaller end of the frustum just clears this surface. Mounted on the counterweight 122 is a bearing support member 124 which is provided with centering screws for engagement with the counterweight to provide adjustment of the bearing support member with respect to the counterweight.

A bearing mount 126 is secured to the bearing support 124 by an annular flange and has a thin metal portion extending across the bearing support and desirably provided with large openings so as to have a slight springing action. This portion of the member 126 clears the bearing support at its center so that it may flex slightly downwardly. At its center, the member 126 carries a jewel socket 128 for the reception of the pointed end of a pin 130 secured in a hemispherical float 132 which, at its lower portion, carries a counterweight ring 134.

The spherical chamber 116 is filled with a suitable liquid having a substantial buoyant action on the elements within the chamber. At its lower end, the chamber 116 communicates with a central opening 136 leading to a space 138 above a flexible diaphragm 140 which is held in position spaced from the lower element 114 by a cap 142 fitted in the lower end of the casting member 26 and suitable spacing rings.

A pair of lamps 144 mounted in a coupling member 146 between the casing parts 26 and 28 are positioned so as to illuminate the inclination unit. The lamps are connected to the batteries by the timing means mounted in the portion 30 of the casing.

An axially extending chamber 148 is provided within the coupling 146 and extends between the inclination unit and the lower surface of the film sprocket 102. A lens 150 positioned in the chamber 148 serves to project an image of the inclination unit upon the portion of the film which is lowermost upon the film sprocket 102.

The arrangement is such that the timing means contained in the portion 30 of the instrument serves to illuminate the lamps at predetermined intervals, for example, every ten seconds. The lamps are illuminated for a sufficient interval to expose an image of the inclination unit on the lowermost portion of the film positioned on the sprocket 102. After the timing means has interrupted the circuit through the illuminating lamps the sprocket wheel is advanced a sufficient distance to present a new film area for the next successive recording operation. As previously noted, this complete apparatus is more fully described in the above-mentioned application. The essential distinction between the inclination unit employed herewith and that described in the above-mentioned application is that in the present unit there are no compass elements mounted in the inclination unit. Thus the unit is employed only for the purpose of indicating inclination. The markings on the hemispherical surface of the inclination unit 132 are indicated in Figure 6 showing a record member produced by the instrument. These markings include concentric circles 152 about the polar axis of the hemisphere serving as measurements of inclination. The fixed reference marking 120 engraved in the upper hemispherical member 112 will appear on the recorded photograph as indicated in Figure 6 as superimposed upon the concentric circles. Included in the reference marking are cross lines, one of which bears an indicating mark 154 which serves to orient the position of the record with the position of the instrument housing. It will be noted that in the record produced by the gyroscopic instrument the conductor 44 provides a similar orientation between that record and the casing of the instrument. Thus, when the two record members are positioned relatively to each other as shown in the relative positions of Figures 4 and 6, it will be evident that if the gyroscope conductor 44 and the cross lines bearing the marking 154 were positioned one above the other in the assembled apparatus and the pointer 48 is pointing in a northerly direction, the upper portion of the gyroscopic instrument record shown in Figure 4 was toward the north when that record was made and, similarly, the upper portion of the inclination unit record shown in Figure 6 was also toward the north when that record was made.

In operation, the two recording instruments are loaded with film, their timers wound and set and the instruments are then positioned in their respective housings with the reference mark 154 in the inclination unit and the conductor 44 in the gyroscopic unit positioned in predetermined relation providing azimuthal correlation between the records produced by each of the two instruments. The apparatus is then lowered into a bore hole on a wire line or, alternatively, may be go-deviled in a drill stem and variously positioned in a bore hole by raising or lowering the drill stem. It will be evident that by the use of a clock at the surface of the earth synchronized with the clocks in the two instruments and read in conjunction with the various depths at which the entire assembly is positioned at various times a record is obtained of the depth at which any particular set of recordings are made.

So long as the apparatus is lowered in a relatively straight or vertically extending bore hole, the gyroscopic instrument will produce accurate results. When, however, the bore hole deviates substantially from the vertical, the errors previously discussed will appear in the recordings obtained by the gyroscopic unit. These errors may be corrected by means of the following procedure. If the two instruments are positioned in spaced relation by, for example, 100 feet of pipe 14 and if the entire apparatus is lowered in steps of 100 feet, then records will be made by the inclination unit at the same depths in the earth as previous records were made by the gyroscopic unit. If, as previously described, the two units are connected by means of a drill stem, their records can be azimuthally oriented and this permits employing the record made by the inclination unit in the location at which a prior record was made by the gyroscopic unit to be employed as a check for the azimuthal indication of the subsequent record made by the gyroscopic unit.

More specifically, referring to Figure 7A it may be assumed that a circle 160 represents a record taken from the inclination unit, a circle 162 represents a record taken from the gyroscopic unit and the construction line 164 connecting the two circles represents the length of drill stem which serves to maintain the indicating lines 166 and 168 on the two records in azimuthally oriented positions. If these two records are made at depths in the earth spaced by 100 feet, it is possible that the upper inclination record will be made in a straight bore hole as indicated by the location of the record mark 169 when the lower inclination record is made in an inclined bore hole as indicated by the location of the record mark 170. The azimuthal direction of this latter indication of inclination may be determined from the position of the pointer N which may be assumed to be pointing to the north. Th angle of inclination from the north is the angle indicated at $a_1$. The angle of inclination from the vertical may be determined by the radial distance of the record mark 170 from the center of the record 162.

If the entire apparatus is now lowered 100 feet deeper into the bore hole, the next successive inclination unit record, as shown at 160' in Figure 7B, will be made at the same depth in the bore hole as was the prior gyroscopic record 162. However, the second gyroscopic record 162' will be made 100 feet deeper in the bore hole. At this location both the direction and degree of inclination of the bore hole may have varied as is indicated by the position of the record mark 170', the direction of inclination being indicated by the angular displacement between the record mark 170' and the gyroscopic indicator N. Due to the fact that the entire apparatus may have rotated within the bore hole during its descent from the position at which the records of Figure 7A were made to the position at which the records of Figure 7B are made, the azimuthal correlation marks in Figure 7B may assume new positions as indicated at 166' and 168'. However, in the record produced by the inclination unit, the mark 170 indicating inclination will be at an angular displacement from north equal to $a_1$ as was the mark 170 on the gyroscopic record member 162 in Figure 7A. Therefore, if the angle $b_1$ between north and the azimuthal correlation mark 166' is measured and is translated down to the gyroscopic record member 162' produced at the second 100 foot level, the actual location of north with respect to the azimuthal correlation mark 168' can be determined as indicated by the arc $b_1$ on that record. Then the displacement $\Delta_1$ between the north indication of the gyroscopic unit and the true north can be determined and this correction can be applied to provide a correct measure of the angle of inclination from north as being the angle $a_2$.

In a third succesive level of recordings, the inclination unit record 160'' as shown in Figure 7C is positioned at the same level as the former gyroscopic record 162'. At this time the subsequent gyroscopic record 162'' will be 100 feet below its prior position. The inclination unit at the third level which is equivalent to the level of the former gyroscopic record 162' provides an indication of inclination 170' identical to that provided by the prior gyroscopic record at that level. The angle $a_2$ previously determined is the angle formed between this record point and true north. At this third position of the entire apparatus, the azimuthal correlation mark 166 may now assume a third position as indicated at 166'' due to further rotation of the entire apparatus within the bore hole and thus at this third recording position the angle $b_2$ will indicate the angle between north and the correlation mark. This angle $b_2$ may then be translated downwardly to the gyroscopic record 162″ at which the correlation mark 168″ is then at an angle of $b_2$ from true north. If at this third position of the gyroscopic record the gyroscope pointer N is at a position of $\Delta_2$ from the true north, the necessary correction may be applied for the gyroscope at this position in the earth and the new angle of inclination of the bore hole at that level, as indicated by the inclination record 170″, may be determined. This angle from the true north is $a_3$ and the angle $a_3$ may then be applied to correct a subsequent gyroscope reading in accordance with the foregoing procedure. It will be evident that by this method of projected corrections the gyroscopic record may be corrected through a succession of survey records for inaccuracies arising in the azimuthal indication of the gyroscope unit due to irregular drift and rotor tilt.

As will be evident from Figure 6, the azimuthal direction of relatively small angles of inclination can be read with only limited accuracy from the record made from the inclination unit. However, at relatively small angles of inclination, the drift of the gyroscope rotor can be determined with a fairly high degree of accuracy. Thus at small angles of inclination of the bore hole there is substantially no need for the making of corrections and it is only at high angles of inclination where readings may be accurately made from the records in the inclination unit that it is necessary to use these readings to correct the indications obtained from the gyroscope unit.

What is claimed is:

1. A method of surveying bore holes by use of apparatus including two inclinometers definitely spaced one above the other, which comprises initially positioning said apparatus in a bore hole, repeatedly lowering said apparatus a distance equivalent to the spacing between said two inclinometers, in said initial and in each succeeding lower position of said apparatus recording on record elements azimuthal direction indications and inclination indications of the lower one of said inclinometers and at the same time separately recording on different record elements inclination indications of the upper one of said inclinometers thereby to provide pairs of records made at the same time and different pairs of records made at the same depth, providing upon each pair of record elements made at the same time indications azimuthally relating the same, providing for the progressive correction of the recorded azimuthal indications given by said lower inclinometer by orienting each successive pair of record elements made at the same time through the medium of the indications aforesaid provided for the purpose, and alternately orienting each successive pair of record elements made at the same depth through the medium of their inclination indications.

2. A method of surveying a bore hole comprising recording on a first record element at each of a succession of depths in a bore hole azimuthal direction indications and inclination indications of a first inclinometer, recording inclination indications of a second inclinometer on a second record element at each prior depth when making each successive recording of the azimuthal and first inclinometer indications to produce pairs of records, providing on each record element an indication azimuthally relating the two records of each pair, azimuthally orienting first record of a first pair of records and the second record of a second next succeeding pair of records by means of their inclination indications, and azimuthally orienting the two records of said second pair of records by means of said azimuthal relation indications to provide for correction of the recorded azimuthal indication on the first record of said second pair of records.

3. Apparatus for surveying a bore hole comprising a first instrument unit including a gyroscope, an inclinometer, and means for recording azimuthal direction indications of said gyroscope and inclination indications of said inclinometer, a second instrument unit axially aligned with said first instrument unit including an inclinometer, and means for recording inclination indications of said inclinometer, means interconnecting said instrument units and maintaining the same in fixed widely spaced relation to one another, means for actuating at the same time the two said means for recording, said instrument units being adapted for producing at successive depths in a bore hole pairs of recordings made at the same time and different pairs of recordings made at the same depth, and means for providing on each pair of recordings made at the same time indications for azimuthally orienting said pair of recordings to provide for progressively correcting the recorded azimuthal indications given by said gyroscope.

4. Apparatus for surveying a bore hole comprising a first instrument unit including a gyroscope, an inclinometer, and means for recording azimuthal direction indications of said gyroscope and inclination indications of said inclinometer, a second instrument unit above and axially aligned with said first instrument unit including an inclinometer, and means for recording inclination indications of said inclinometer, means interconnecting said instrument units, maintaining the same in fixed widely spaced relation to one another and securing the same against turning about the axis of said instrument units relative to one another, means for actuating at the same time the two said means for recording, said instrument units being adapted for producing at successive depths in a bore hole pairs of recordings made at the same time and different pairs of recordings made at the same depth, and means for providing on each recording of each pair thereof made at the same time an indication for azimuthally orienting said pair of recordings to provide for progressively correcting the recorded azimuthal indications given by said gyroscope.

References Cited in the file of this patent

UNITED STATES PATENTS

| Number | Name | Date |
|---|---|---|
| 1,837,479 | Pew et al. | Dec. 22, 1931 |
| 1,877,593 | Roman | Sept. 13, 1932 |
| 1,960,038 | Williston | May 22, 1934 |
| 2,124,892 | Nichols | July 26, 1938 |
| 2,126,740 | Culbertson | Aug. 16, 1938 |